United States Patent
Dajer et al.

(10) Patent No.: US 7,161,912 B1
(45) Date of Patent: Jan. 9, 2007

(54) MULTI-CARRIER/MULTI-SECTOR CHANNEL POOLING IN A WIRELESS COMMUNICATION SYSTEM BASE STATION

(75) Inventors: Miguel Dajer, Succasunna, NJ (US); Michael Francis Garyantes, Warren, NJ (US); Harvey Rubin, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/420,275

(22) Filed: Oct. 18, 1999

(51) Int. Cl.
*H04Q 7/20* (2006.01)

(52) U.S. Cl. .............. 370/328; 370/342; 370/346; 455/561; 455/550.1

(58) Field of Classification Search ............. 370/328, 370/329, 335, 342, 343, 441; 455/561, 562, 455/59, 60; 375/130
See application file for complete search history.

(56) References Cited

U.S. PATENT DOCUMENTS

| | | | |
|---|---|---|---|
| 5,021,801 A | 6/1991 | Smith et al. | 455/562 |
| 5,642,353 A * | 6/1997 | Roy, III et al. | 370/329 |
| 5,768,268 A | 6/1998 | Kline et al. | 370/330 |
| 5,867,763 A * | 2/1999 | Dean et al. | 455/5.1 |
| 5,893,033 A * | 4/1999 | Keskitalo et al. | 455/437 |
| 6,006,111 A * | 12/1999 | Rowland | 455/561 |
| 6,195,566 B1 | 2/2001 | Kanai | 455/562 |
| 6,400,966 B1 * | 6/2002 | Andersson et al. | 455/561 |

FOREIGN PATENT DOCUMENTS

| | | |
|---|---|---|
| EP | 0 994 582 A1 | 4/2000 |
| JP | 10-023497 | 1/1998 |
| WO | WO 95/33350 | 12/1995 |
| WO | WO 99/18744 | 4/1999 |

OTHER PUBLICATIONS

Merriam-Webster's Collegiate Dictionary, 10th. ed., © 1997, p. 1174.*

* cited by examiner

*Primary Examiner*—Jean Gelin

(57) ABSTRACT

A wireless communication system base station includes a number of channel unit boards, each including multiple channel elements for providing processing operations for signals assigned to multiple carriers of the system. A given channel unit board includes a multiplexer which is operative to implement multi-carrier/multi-sector channel pooling by assigning a given one of the channel elements of that board to any one of the multiple carriers of the system. For example, the multiplexer in the given channel board may be operative to connect the channel elements of that board to I/Q signal buses associated with different system carriers. The I/Q signal bus for each of the carriers is then combined on the given board with corresponding signals from other boards. The invention allows each of N channel elements of the given channel unit board to be assigned to a particular one of up to N carriers of the system, thereby providing substantially improved flexibility in terms of system configuration.

27 Claims, 5 Drawing Sheets

MULTI-CARRIER/MULTI-SECTOR CHANNEL POOLING IN A WIRELESS COMMUNICATION SYSTEM BASE STATION

FIELD OF THE INVENTION

The present invention relates generally to base station equipment in code division multiple access (CDMA) wireless systems and other types of wireless communication systems, and more particularly to channel pooling techniques for use in base station equipment.

BACKGROUND OF THE INVENTION

The rapid pace of development in wireless communication systems has typically led to significant changes to the standards which define the operation of such systems. For example, the standards defining the operation of IS-95 CDMA wireless systems have progressed from TIA/EIA IS-95A to TIA/EIA IS-95B, and are now in the process of moving toward TIA/EIA IS-2000, also known as IS-95C. The IS-95A, IS-95B and IS-95C standards are collectively referred to herein as IS-95. Other CDMA standards, such as Multi-Carrier (MC) cdma2000 and the next-generation European standard known as Universal Mobile Telecommunication System (UMTS), are also being proposed.

These related standards each generally define an air interface specification that allows a mobile unit to communicate with a base station associated with a cell site. The interface definition typically includes a set of air interface channels, channel signal encoding rules, and signaling messages to enable the mobile unit to place and receive voice or data calls to and from a land line network, as well as to and from other mobile users.

FIG. 1 shows an example of a base station 100 configured in accordance with the above-noted IS-95 standard. The base station 100 includes a control computer 102, a control and traffic bus 104, and a set of M channel unit boards 106-$i$, $i=1$, 2, . . . M. The control computer 102 interfaces with a mobile switching center (MSC) which provides a link to other base stations and to a public switched telephone network (PSTN). In an IS-95 CDMA system, spread spectrum digital signals from different user calls on a given base station antenna sector are added together to generate a composite spread spectrum digital signal for that sector. The composite spread spectrum digital signal is generated by one or more of the channel unit boards 106. The base station design of FIG. 1 allows the channel unit boards 106 to communicate signals from one such board to the next in support of users on one CDMA carrier, designated C1, and up to three 120° antenna sectors, designated α, β and γ. Three sector systems are commonly used in practice, although omni-directional and two-sector systems may also be deployed. The use of a larger number of sectors, such as six sectors, is less common, but also possible.

Within each channel unit board 106-$i$ in the base station 100 of FIG. 1, the spread spectrum digital signals of up to N users are added together on a per-sector basis. For each sector, the summed spread spectrum digital signals of users served by a particular channel unit board 106-$i$ are added to the respective signals from the previous channel unit board, i.e., the channel unit board to its left in the FIG. 1 design. The summed digital signals are output from the channel unit board 106-$i$, and become inputs to the next-in-line channel unit board 106-($i$+1) closer to a set of three radio boards 108-1, 108-2 and 108-3 in FIG. 1. Therefore, up to N users per channel unit board are added together by the mechanism of summing the signals from channel unit board to channel unit board. In a design with M such channel unit boards, each supporting up to N users, up to M×N total users can be supported on the three sectors α, β and γ. The interconnections between the channel unit boards are provided by a transmit digital signal communications bus denoted Tx-bus.

It should be noted that although the description of the base station 100 of FIG. 1 is directed primarily to its transmit operations, similar interconnection issues arise with respect to receive operations. The corresponding receive bus (Rx-bus) is omitted from FIG. 1 for clarity and simplicity of illustration.

The digital processing elements on each of the channel unit boards 106-$i$ can be used to support a user call on any of the three sectors α, β and γ. This capability is referred to herein as channel element pooling, or simply channel pooling, and in the FIG. 1 design, is applied to one carrier and three sectors. Such an arrangement is more particularly referred to as single-carrier/multi-sector channel pooling.

In FIG. 1, digital in-phase (I) and quadrature phase (Q) signals for each of the three sectors α, β and γ and the one CDMA carrier C1 are summed from channel unit board to channel unit board, and finally are passed to one of the three radio boards 108-1, 108-2 and 108-3, depending on the sector. Each radio board 108-1, 108-2 and 108-3 converts the digital I and Q signal inputs into an RF signal. The RF signals for sectors α, β and γ are then amplified by power amplifiers 110-1, 110-2 and 110-3, filtered in transmit filters 112-1, 112-2 and 112-3, and radiated by transmit antennas 114-1, 114-2 and 114-3, respectively. Other types of conventional techniques may be used to communicate signals among the channel unit boards, e.g., the I and Q signals for each sector may be multiplexed onto one back plane trace.

Conventional IS-95 CDMA base stations such as base station 100 of FIG. 1 typically support channel element pooling only at the single carrier level, i.e., single-carrier/multi-sector channel pooling. FIG. 2 shows the transmit direction interconnection between channel elements, more specifically referred to herein as cell site modems (CSMs), of a given channel unit board 106-$i$ of base station 100. Each of the N channel elements of a given channel unit board 106-$i$ generally supports a single voice or data call for a particular one of N users, and may correspond to, e.g., a single integrated circuit or a portion of an integrated circuit. In FIG. 2, channel elements 120-N, 120-(N−1) and 120-(N−2) are interconnected in a "daisy chain" arrangement as shown. Although not shown in FIG. 2, one or more additional chains may be provided for redundancy in case an element of a given chain fails. A given channel element of the exemplary chain shown in FIG. 2 combines its own outputs for the three sectors α, β and γ with the corresponding outputs of the previous element of the chain. The resulting combined outputs are then delivered to the next element in the chain. The output of the last element in the chain, i.e., element 120-N in this example, is delivered to the system backplane or to a suitable board combiner for further processing as previously described.

FIG. 3 shows an example of the interconnection of channel elements in the transmit and receive directions. In the receive direction, all the CSMs in a given chain receive the same information, i.e., the CSMs are connected using a broadcast bus rather than a daisy chain. The FIG. 3 arrangement includes two chains A and B of N=10 channel elements each, with the channel elements in each chain denoted CSM0 through CSM9. Each of the channel elements in each of the chains receives baseband receive data for each of the three sectors α, β and γ. Since the transmit and receive channels are symmetric, the same carrier assigned for the transmit direction is also assigned for the receive direction.

A significant problem with the conventional single-carrier/multi-sector channel pooling arrangements described in conjunction with FIGS. 1, 2 and 3 above is that when any one of the channel elements in a given chain is assigned to a particular carrier, all the channel elements in that chain, or in this case the corresponding channel unit board, cannot be assigned to any other carriers in the system. Another problem with the conventional arrangements is that a failure of a single channel element in the chain can cause the entire chain to fail. A need therefore exists for a multi-carrier/multi-sector channel pooling arrangement that provides increased system flexibility and reliability relative to conventional single-carrier/multi-sector channel pooling.

SUMMARY OF THE INVENTION

The present invention provides multi-carrier/multi-sector channel pooling techniques for use in wireless system base stations. In accordance with the invention, a wireless communication system base station includes a number of channel unit boards, each with multiple channel elements for providing signal processing operations. A given channel unit board includes a multiplexer which is operative to implement multi-carrier/multi-sector channel pooling by assigning a given one of the channel elements of that board to any one of the multiple carriers of the system. For example, the multiplexer in the given channel board may be operative to connect the channel elements of that board to I/Q signal buses associated with different ones of the system carriers. The I/Q signal bus for each of the carriers is then combined on the given board with corresponding signal buses for the same carrier from other boards. The invention can thus be used to assign each of N channel elements of the given channel unit board to a particular one of up to N carriers of the system.

Advantageously, the invention allows channel elements of a channel unit board to be pooled across all the available carriers in a given system configuration. In addition, the invention provides increased system reliability, since any failed channel element on a given channel unit board is simply not used, and does not otherwise affect the performance of that channel unit board. Furthermore, the invention allows base station equipment to be easily and efficiently upgraded or otherwise reconfigured to support changes in operating standards. These and other features and advantages of the present invention will become more apparent from the accompanying drawings and the following detailed description.

DETAILED DESCRIPTION OF THE INVENTION

The present invention will be illustrated below in conjunction with exemplary wireless communication systems. It should be understood, however, that the invention is not limited to use with any particular type of wireless system, but is instead more generally applicable to any wireless system in which it is desirable to provide more flexible channel pooling capabilities in system base stations, such that the base stations can more readily accommodate upgrades or other changes in system operating standards. For example, although the techniques are illustrated with reference to systems configured in accordance with IS-95 CDMA standards, it will be apparent to those skilled in the art that the techniques are also applicable to other wireless systems.

Figure 4:
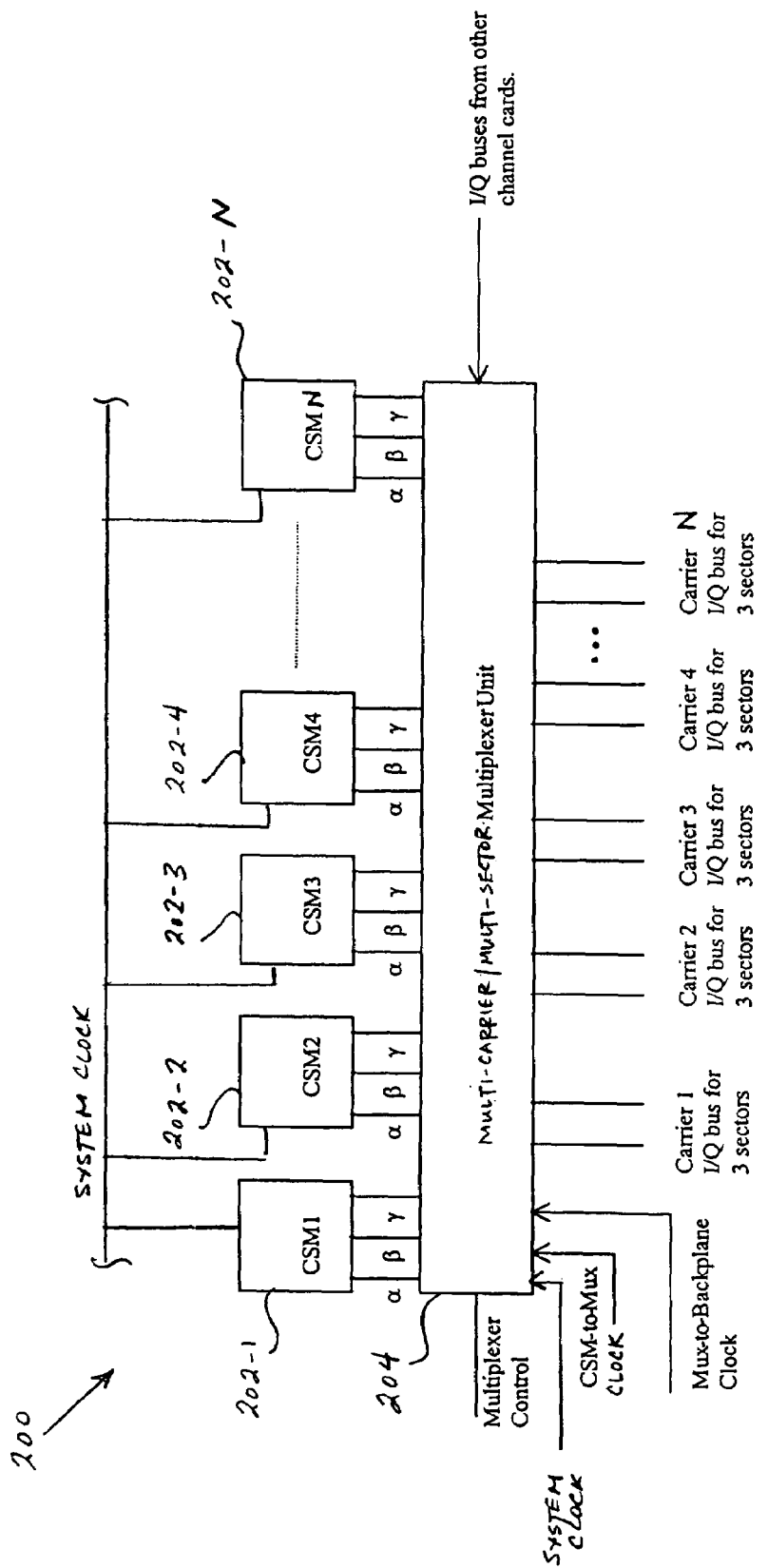
FIG. 4 illustrates multi-carrier/multi-sector pooling of channel elements in an illustrative embodiment of the invention.

FIG. 4 shows an illustrative embodiment of a channel unit board 200 with multi-carrier/multi-sector channel pooling in accordance with the invention. This embodiment includes N channel elements 202-1, 202-2, . . . 202-N, also denoted CSM1 through CSMN, and a multi-carrier/multi-sector multiplexer 204. A system clock is coupled to each of the channel elements and the multiplexer 204. The multiplex 204 allows each of the channel elements 202-$j$, $j=1, 2, \ldots$ N, to be assigned to any carrier and sector available in the system backplane. The multiplexer 204 has inputs coupled to $\alpha$, $\beta$ and $\gamma$ sector outputs from each of the channel elements 202-$j$. Each of the $\alpha$, $\beta$ and $\gamma$ sector outputs in this embodiment includes I and Q signals for that sector. Although this embodiment uses three sectors, it should be understood that the invention can be applied to any number of sectors.

The multiplexer 204 can couple the sector outputs from the N channel elements to any one of up to N different carrier I/Q buses. The connection of $\alpha$, $\beta$ and $\gamma$ sector outputs from each channel element 202-$j$ to particular channel buses is determined by a multiplexer control signal applied to the multiplexer 204. Although in this embodiment the number N is used to designate the number of channel elements as well as the maximum number of different carriers, for simplicity of illustration, it should be understood that the number of channel elements and number of carriers need not be equal, and in practice typically will not be equal. More specifically, the number of carriers is generally less than the number of channel elements in a given implementation.

Figure 1:
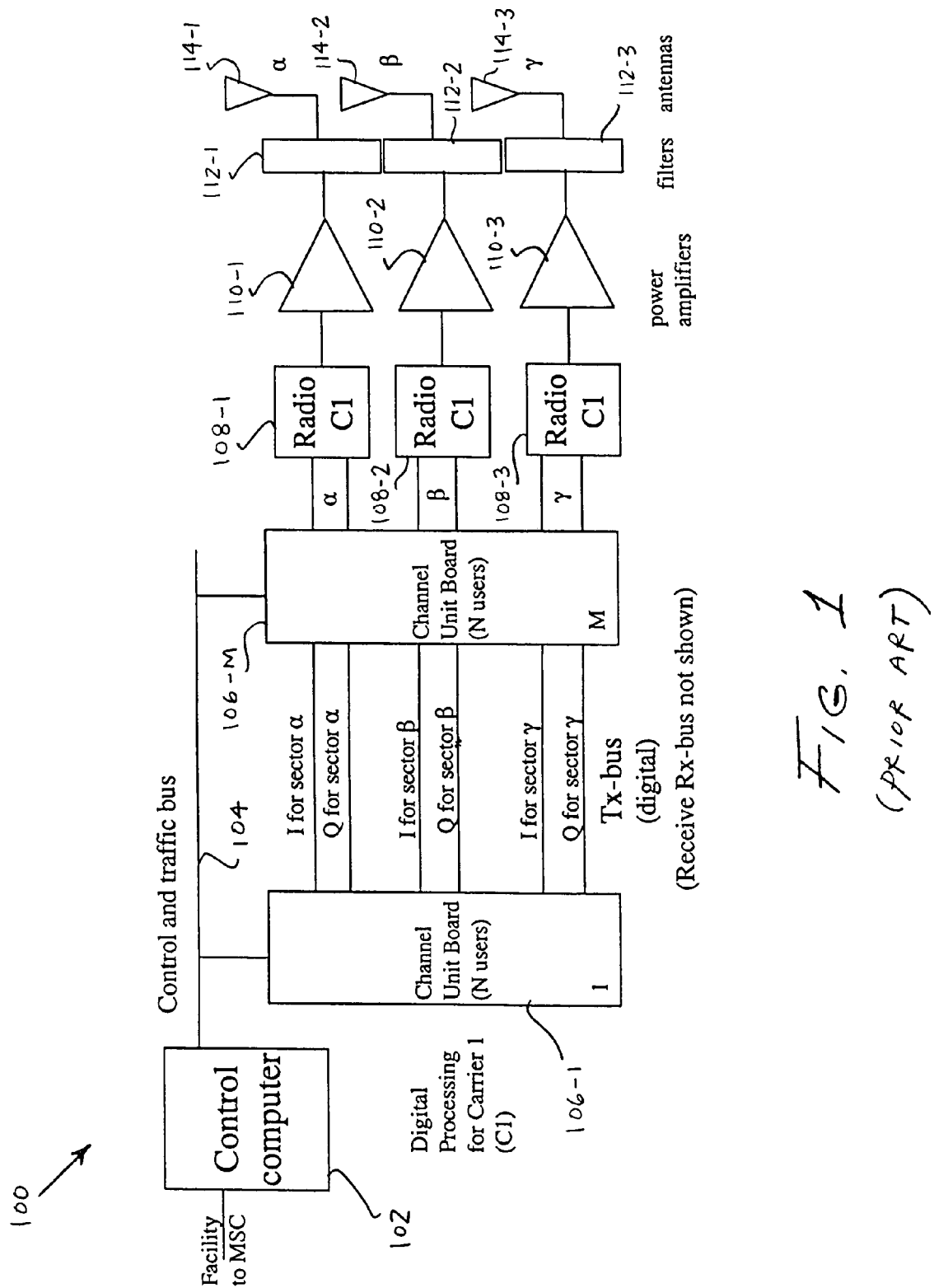
FIG. 1 shows an example of a conventional base station designed to support the IS-95 CDMA wireless communication standard.
Figure 2:
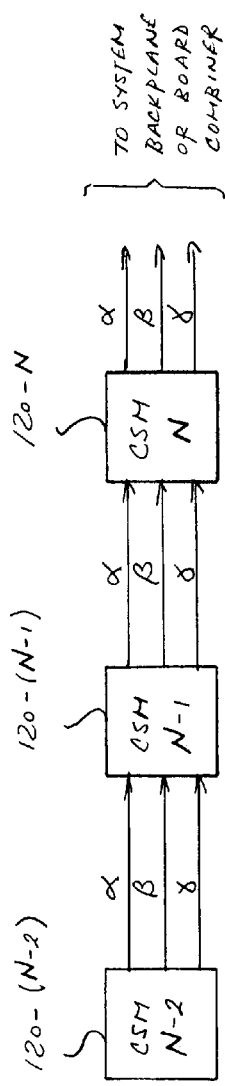
FIGS. 2 and 3 illustrate conventional interconnection of multiple channel elements in the conventional base station of FIG. 1.
Figure 3:
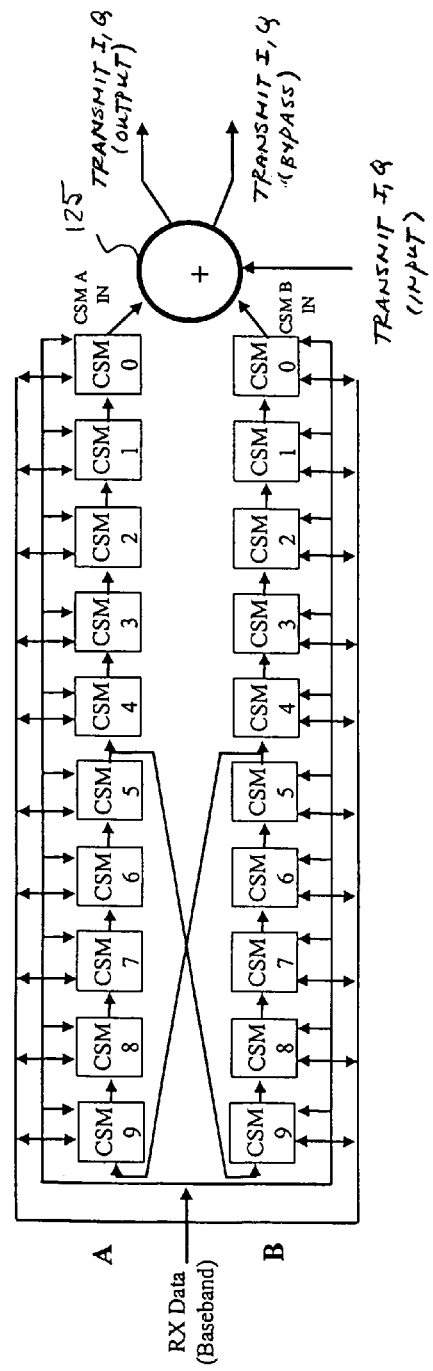

The multiplexer control signal may be generated, e.g., by a control computer, such as control computer 102 of FIG. 1, associated with the corresponding system base station. The multiplexer 204 is further operative to combine the I and Q signals from downstream channel unit boards with the locally generated I and Q data streams of the channel unit board 200 on a per carrier, per sector basis. Other input signals applied to the multiplexer 204 include a CSM-to-Mux clock and a Mux-to-Backplane clock.

As an example of one possible configuration for the channel unit board 200 of FIG. 4, assume that the corresponding system will support up to six carriers and three sectors, or a total of 18 carrier/sectors of channel element pooling. For simplicity of illustration, it will also be assumed that the channel unit board 200 includes N=6 channel elements 202-$j$, each capable of processing one carrier and three sectors of I and Q signal data. In addition, it is assumed that the multiplexer 204 is able to digitally sum the channel element outputs for the channel elements assigned to the same carrier. It should be understood that these configuration parameters are by way of example only, and are in no way intended to limit the class of possible system configurations in which the invention may be implemented. It should be noted that other parameters, such as the number of bits per sector output, the CSM-to-Mux clock rate and the Mux-to-Backplane clock rate, will generally vary depending upon the particular implementation used, as is well known in the art, and are therefore not specified herein.

In the above-described example configuration, if carrier 1 needs to add a call or other type of communication channel, the system control computer will direct the multiplexer 204 to route the sector outputs of the selected channel element, e.g., CSM2, to the carrier 1 I/Q bus. The I and Q signals from this channel element are then combined with the I and Q signals of the same carrier from downstream channel unit boards. If another channel needs to be added to carrier 2, the multiplexer will first combine the sector outputs of the two channel elements, e.g., CSM2 and CSM3, and then combine them with the carrier 2 I/Q bus from downstream channel unit boards. If another channel then needs to be added to carrier 3, another available channel element is selected and assigned to carrier 3, by generation of an appropriate multiplexer control signal. By implementation of appropriate control logic in the multiplexer 204, any desired number of carriers and sectors can be supported in the channel unit board 200.

Figure 5:
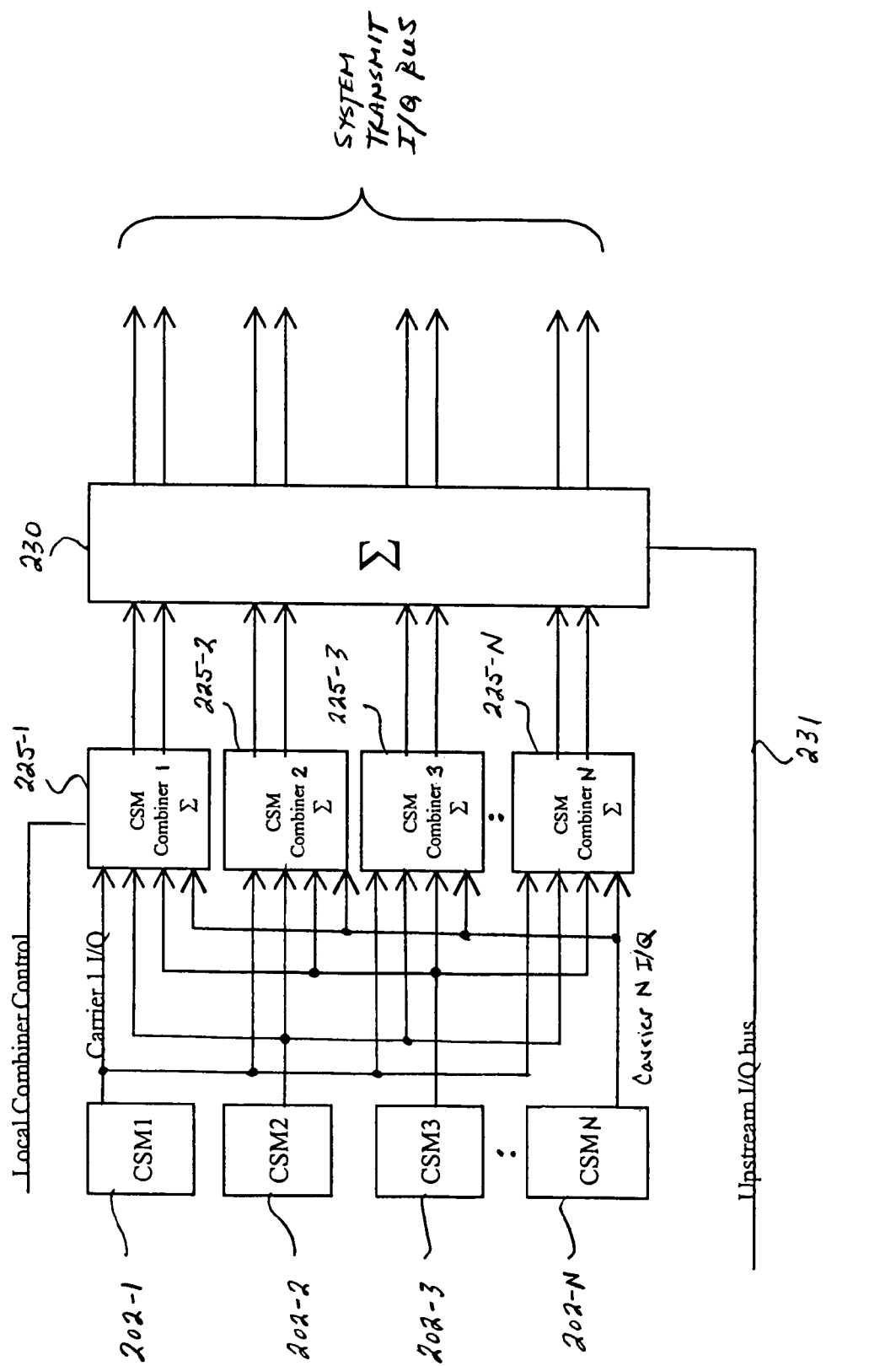
FIG. 5 shows a more detailed illustration of interconnection of multiple channel elements in a transmit direction, in accordance with the illustrative embodiment of the invention.

FIG. 5 illustrates in greater detail the manner in which the N channel elements 202-$j$ of the channel unit board 200 are combined in the transmit direction. Each of the channel elements 202-$j$ is coupled to one of the carrier I/Q buses as previously described. The carrier I/Q buses are then applied to each of N combiners 225-$j$ which sum the channel element outputs for each of the channel elements assigned to each of the carriers.

A local combiner control signal controls the combiners 225-$j$ such that the combiners combine the appropriate channel element signals for each of the carrier I/Q buses. The output of each of the combiners 225-$j$ represents a local carrier I/Q bus for a particular one of the carriers. Each of these local carrier I/Q buses is applied to a multi-carrier digital combiner 230. The multi-carrier digital combiner 230 also receives as an input an upstream I/Q bus 231 carrying corresponding signals from other channel unit boards, and combines the local carrier I/Q buses with the I/Q buses from the other channel boards to generate a system transmit I/Q bus.

The transmit direction combining process illustrated in FIG. 5 thus combines multi-carrier I/Q buses from different channel unit boards by daisy chaining the data from channel unit board to channel unit board and performing a digital sum in each channel unit board. The elements 225-$j$ and 230 may represent elements of the multi-carrier/multi-sector multiplexer 204 of FIG. 4.

Figure 6B:
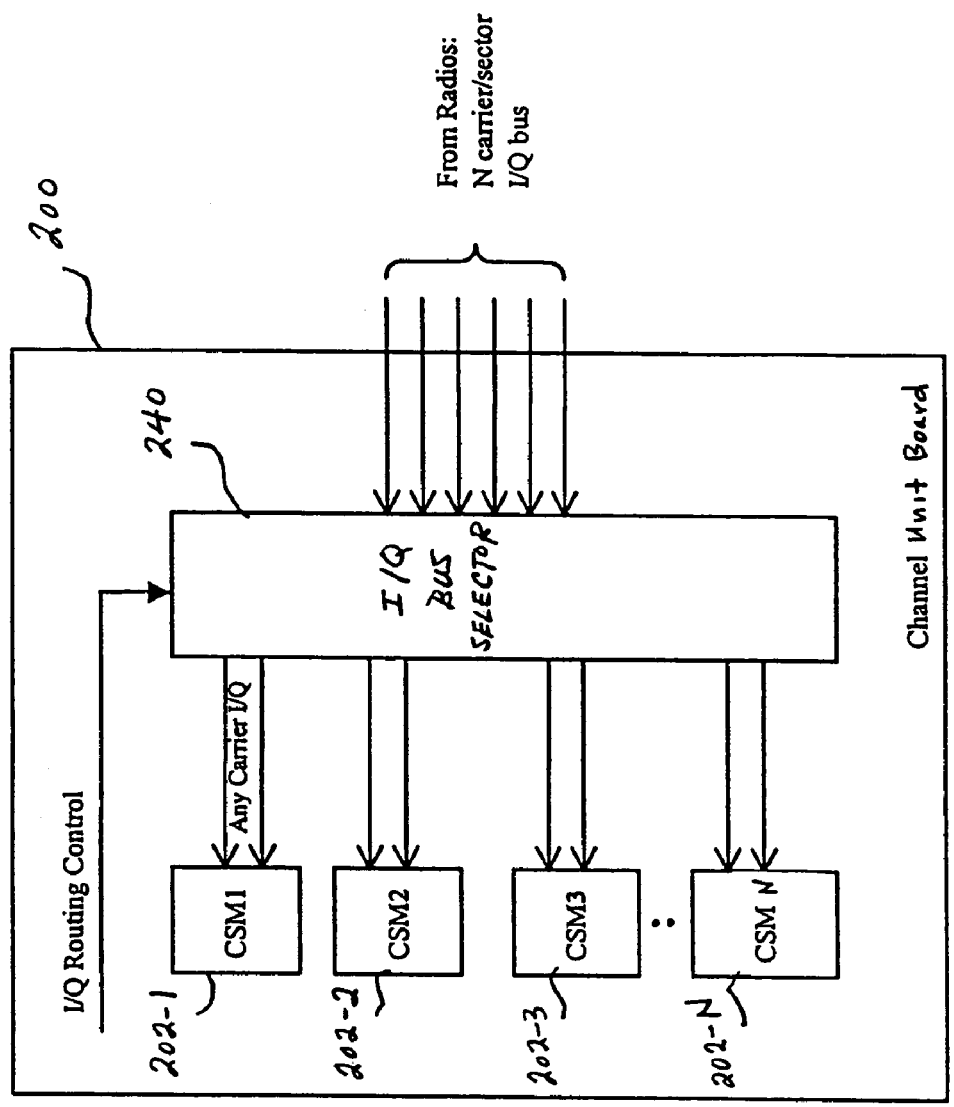
FIGS. 6A and 6B show a more detailed illustration of interconnection of multiple channel elements in a transmit direction, in accordance with the illustrative embodiment of the invention.
Figure 6A:
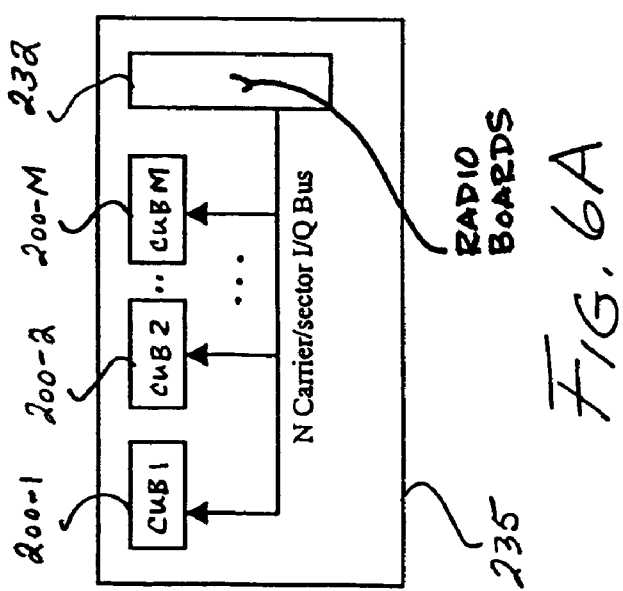
Figure 1:
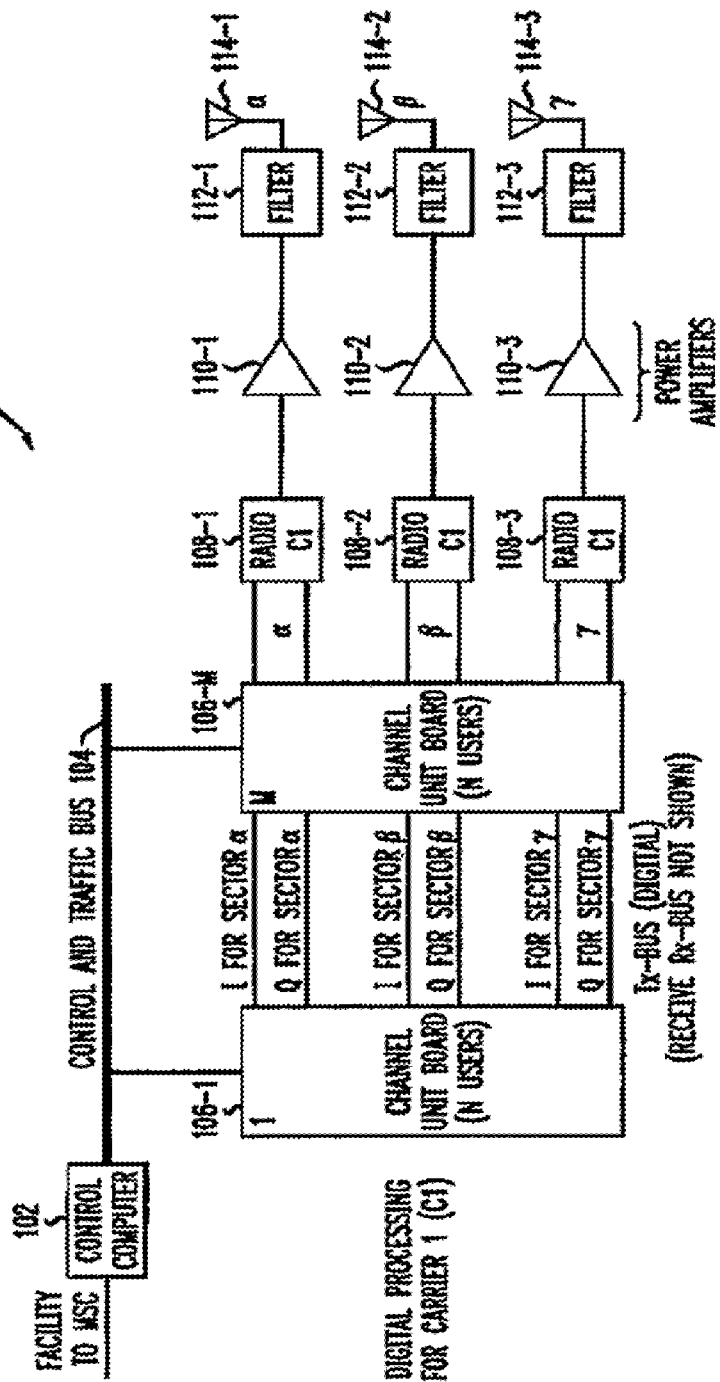
Figure 2:
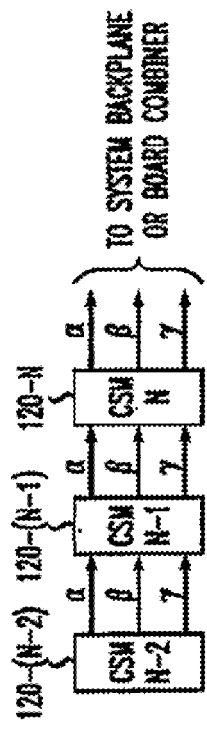
Figure 3:
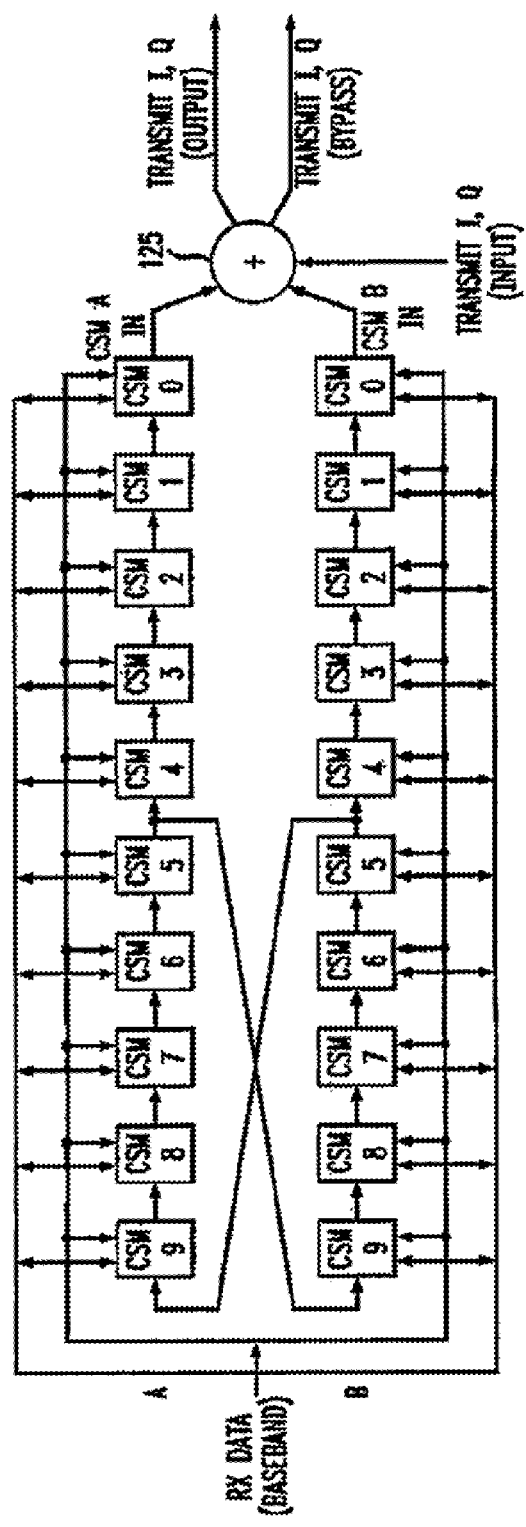
Figure 4:
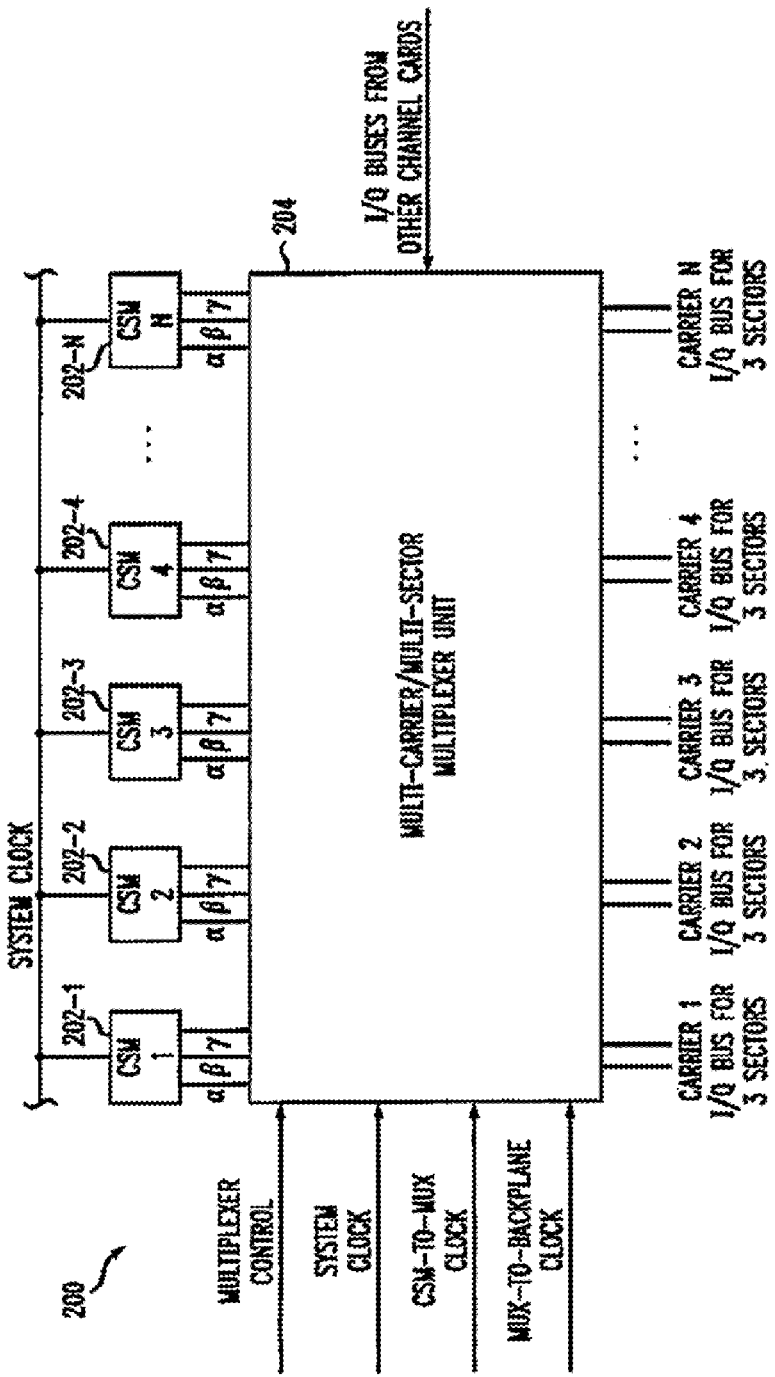
Figure 5:
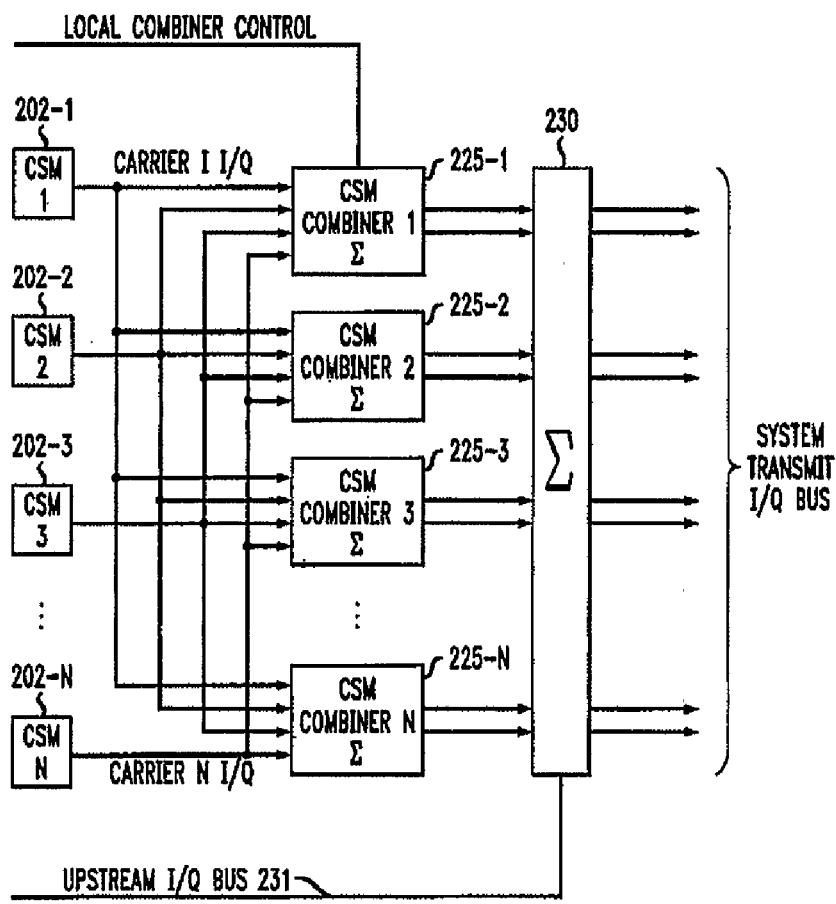
Figure 6A:
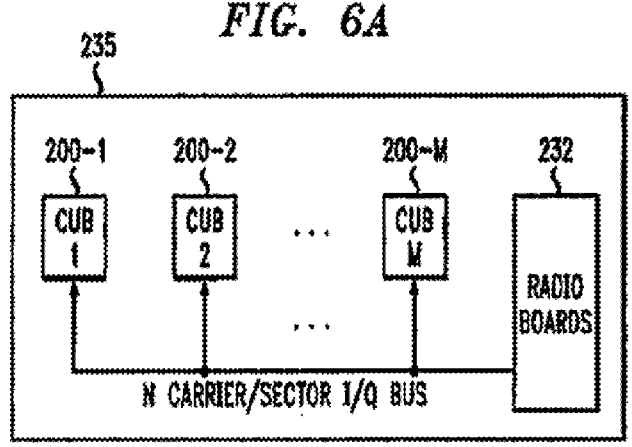
Figure 6B:
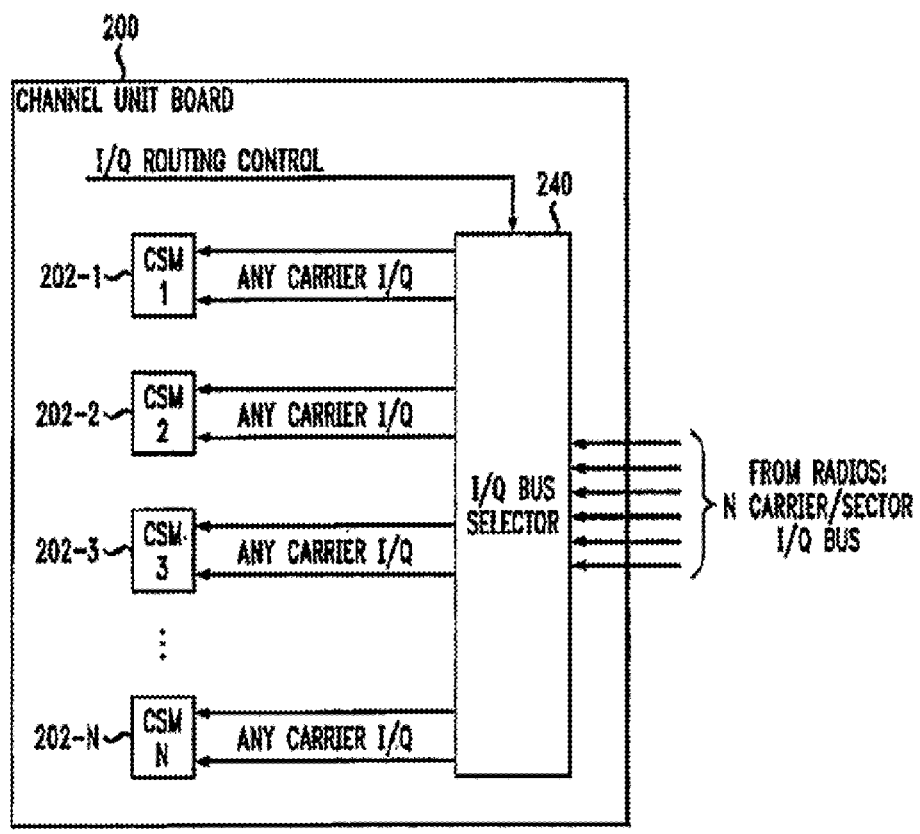

FIGS. 6A and 6B illustrate in greater detail the manner in which the N channel elements 202-$j$ of the channel unit board 200 are combined in the receive direction. In the receive direction, a single broadcast bus per carrier is used to interface a set of radio boards 232 with M channel unit boards each supporting up to N channel elements in the multi-carrier/multi-sector channel pool. In a base station 235 with the set of radio boards 232 and multiple channel unit boards 200-1 (CUB 1), 200-2 (CUB 2), . . . , 200-M (CUB M), each channel unit board will interface to the same I/Q bus, as shown in FIG. 6A. The I/Q bus in such an arrangement is comprised of N carrier/sectors, i.e., the total number of carrier and sector combinations is N. For example, for a six-carrier, three-sector channel pool, a 36-wire I/Q bus can be configured to provide one bit for I and one bit for Q at a specified clock rate. At the input of a given one of the channel unit boards 200, an I/Q bus selector 240, in response to an I/Q routing control signal, connects the correct carrier/sector I/Q bus to the channel elements 202-1, 202-2, . . . , 202-N, as shown in FIG. 6B.

The clock rates and bus structures used in conjunction with the invention may vary in accordance with design preference, and many alternative arrangements are possible. Such arrangements will be readily apparent to those skilled in the art.

Advantageously, the above-described multi-carrier/multi-sector channel pooling arrangement provides substantially improved flexibility relative to the conventional single-carrier/multi-sector approach. More particularly, the channel pooling of the present invention allows any channel element to be assigned to any carrier sector in the system. For example, the channel pooling of the present invention can allow all the channel elements of a given channel unit board to be assigned to a single carrier, or each channel element to be assigned to a different one of K carriers, where $K \leq N$, or any of a number of other combinations. The invention can thus allow a given base station design to support different wireless communication standards using the same base station hardware. The invention also protects the investments of base station equipment purchasers, by allowing existing equipment to be easily and efficiently upgraded to provide additional capacity, or to support changes in operating standards. Furthermore, the invention also provides increased reliability, since any failed channel element on a given channel unit board is simply not used, and does not otherwise affect the performance of that channel unit board.

The above-described embodiments of the invention are intended to be illustrative only. For example, the number, type and arrangement of base station elements may be varied to accommodate particular applications. In addition, the invention can be implemented in base stations configured to operate in conjunction with a variety of different wireless system standards, such as, e.g., IS-95C with or without Orthogonal Transmit Diversity (OTD), Multi-Carrier (MC) cdma2000 or Universal Mobile Telecommunications System (UMTS). These and numerous other alternative embodiments may be devised by those skilled in the art without departing from the scope of the following claims.

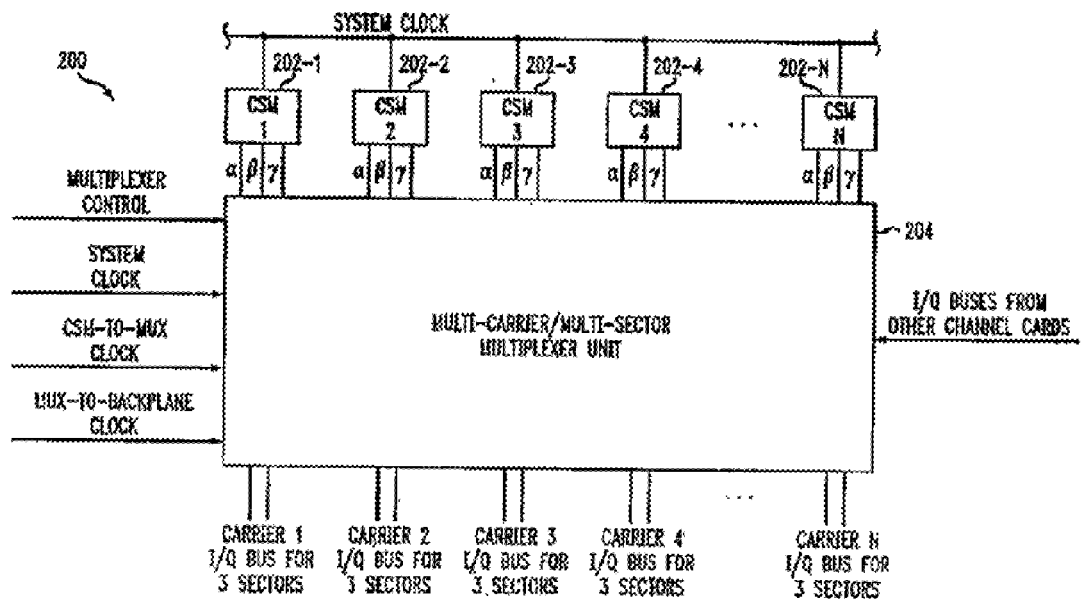

What is claimed is:

1. A base station for use in a code division multiple access wireless communication system, comprising:
   a plurality of channel unit boards each including a plurality of channel elements for providing processing operations for signals assigned to multiple carriers and multiple antenna sectors of the communication system, wherein a given one of the channel elements of one of the channel unit boards is assignable to each of a plurality of carriers and a plurality of antenna sectors of the system.

2. The base station of claim 1 wherein each of the channel unit boards generates a set of digital in-phase (I) and quadrature (Q) signals for each of the plurality of carriers.

3. The base station of claim 2 wherein at least one of the channel unit boards includes a multiplexer operative to connect a given one of the channel elements to an I and Q signal bus associated with a given one of the plurality of carriers.

4. The base station of claim 3 wherein the I and Q signals generated for a given one of the carriers by a given one of the channel unit boards is combined within another of the channel units boards with the I and Q signals generated for the given carrier by the other channel unit board.

5. The base station of claim 1 wherein each of at least a subset of the channel unit boards includes a total of N channel elements, and each of the channel elements may be assigned to one of up to N carriers of the system.

6. The base station of claim 1 further including a control computer operative to generate one or more control signals for controlling assignment of the channel elements of the channel unit boards to the plurality of carriers of the system.

7. The base station of claim 1 wherein the code division multiple access wireless communication system is operative in accordance with at least one of an IS-95A standard, an IS-95B standard, an IS-95C standard with Orthogonal Transmit Diversity (OTD), an IS-95C standard without OTD, a Multi-Carrier (MC) cdma2000 standard, and a Universal Mobile Telecommunications System (UMTS) standard.

8. A method of implementing a base station for use in a code division multiple access wireless communication system, the base station comprising a plurality of channel unit boards each including a plurality of channel elements for providing processing operations for signals assigned to a plurality of carriers and a plurality of antenna sectors of the communication system, the method comprising the step of:
controllably assigning the channel elements of at least one of the channel unit boards to designated ones of the plurality of carriers and the plurality of antenna sectors of the system, such that different channel elements of the channel unit board are assigned to different carriers and different antenna sectors of the system;
wherein a given one of the channel elements of the channel unit board is assignable to each of the plurality of carriers and the plurality of antenna sectors of the system.

9. The method of claim 8 wherein each of the channel unit boards generates a set of digital I and Q signals for each of the plurality of carriers.

10. The method of claim 9 wherein at least one of the channel unit boards includes a multiplexer operative to connect a given one of the channel elements to an I and Q signal bus associated with a given one of the plurality of carriers.

11. The method of claim 10 wherein the I and Q signals generated for a given one of the carriers by a given one of the channel unit boards is combined within another of the channel units boards with the I and Q signals generated for the given carrier by the other channel unit board.

12. The method of claim 8 wherein each of at least a subset of the channel unit boards includes a total of N channel elements, and each of the channel elements may be assigned to one of up to N carriers of the system.

13. The method of claim 8 wherein the assigning step is implemented at least in part using a control computer operative to generate one or more control signals for controlling assignment of the channel elements of the channel unit boards to the plurality of carriers of the system.

14. The method of claim 8 wherein the code division multiple access wireless communication system is operative in accordance with at least one of an IS-95A standard, an IS-95B standard, an IS-95C standard with OTD, an IS-95C standard without OTD, an MC cdma2000 standard, and a UMTS standard.

15. An article of manufacture comprising a machine-readable storage medium for storing one or more programs for use in configuring a base station of a code division multiple access wireless communication system, the base station comprising a plurality of channel unit boards each including a plurality of channel elements for providing processing operations for signals assigned to multiple carriers and multiple antenna sectors of the communication system, the one or more programs when executed implementing the step of:
controllably assigning the channel elements of at least one of the channel unit boards to designated ones of the plurality of carriers and the plurality of antenna sectors of the system, such that different channel elements of the channel unit board are assigned to different carriers and different antenna sectors of the system;
wherein a given one of the channel elements of the channel unit board is assignable to each of the plurality of carriers and each of the plurality of antenna sectors of the system.

16. A base station for use in a code division multiple access wireless communication system, comprising:
a plurality of channel unit boards each including a plurality of channel elements for providing processing operations for signals assigned to multiple carriers and multiple antenna sectors of the communication system, wherein a given one of the channel elements of one of the channel unit boards is assignable to each of a plurality of carriers and a plurality of antenna sectors of the system; and
a control computer coupled to the plurality of channel unit boards, the control computer being operative to assign the channel elements of the channel unit boards to particular ones of the carriers and antenna sectors of the system.

17. A base station for use in a code division multiple access wireless communication system, comprising:
a plurality of channel elements for providing processing operations for signals assigned to multiple carriers and multiple antenna sectors of the communication system; and
a multiplexer operative to assign signals from a given one of the channel elements to each of a plurality of carriers and a plurality of antenna sectors of the system, so as to implement a multi-carrier multi-sector channel pooling arrangement.

18. A method of implementing a base station for use in a code division multiple access wireless communication system, the base station comprising a plurality of channel elements for providing processing operations for signals assigned to a plurality of carriers and a plurality of antenna sectors of the communication system, the method comprising the step of:
controllably assigning the channel elements to designated ones of the plurality of carriers and the plurality of antenna sectors of the system, so as to implement a multi-carrier multi-sector channel pooling arrangements;
wherein a given one of the channel elements is assignable to each of the plurality of carriers and the plurality of antenna sectors of the system.

19. A base station for use in a code division multiple access wireless communication system, comprising:
a plurality of channel unit boards each including a plurality of channel elements for providing processing operations for signals transmitted by the system; and a controllable signal combiner element coupled to the plurality of channel unit boards;

wherein the controllable signal combiner element implements an assignment of signals from each of the channel elements of a given one of the channel unit boards for transmission on one or more of a plurality of carriers and a plurality of antenna sectors of the system;

wherein a given one of the channel elements of the given channel unit board is assignable to each of the plurality of carriers and the plurality of antenna sectors of the system.

20. The base station of claim 19 wherein the controllable signal combiner element further comprises:

a set of controllable signal combiners associated with a given one of the channel unit boards and each having a plurality of inputs, with each of the inputs coupled to an output of a particular one of the plurality of channel elements of the given channel unit board; and a multi-carrier combiner having a plurality of inputs, with each of the inputs coupled to an output of a corresponding one of the controllable signal combiners, the multi-carrier combiner further having an additional input coupled to a bus output of another of the plurality of channel unit boards, and generating a set of outputs on a system transmit bus.

21. The base station of claim 19 wherein each of the channel unit boards generates a set of digital in-phase (I) and quadrature (Q) signals for each of the plurality of carriers.

22. The base station of claim 19 wherein each of at least a subset of the channel unit boards includes a total of N channel elements, and each of the channel elements may be assigned to one of up to N carriers of the system.

23. The base station of claim 19 further including a control computer operative to generate one or more control signals for application to the controllable signal combiners and the multi-carrier combiner so as to control assignment of each of at least a subset of the channel elements of the given channel unit board to one or more of the plurality of carriers of the system.

24. A base station for use in a code division multiple access wireless communication system, comprising:

a plurality of channel unit boards each including a plurality of channel elements for providing processing operations for signals received by the system; and a controllable selector associated with a given one of the channel unit boards and receiving as inputs a set of signals associated with a receive bus of the system, the controllable selector having a plurality of outputs, each coupled to a corresponding input of one of the channel elements of the given channel unit board;

wherein the controllable selector implements an assignment of received signals from each of a plurality of carriers and a plurality of antenna sectors of the system to one or more of the channel elements of the given channel unit board;

wherein a given one of the channel elements of the given channel unit board is assignable to each of the plurality of carriers and the plurality of antenna sectors of the system.

25. The base station of claim 24 wherein each of the channel unit boards processes a set of digital in-phase (I) and quadrature (Q) signals for each of the plurality of carriers.

26. The base station of claim 24 wherein each of at least a subset of the channel unit boards includes a total of N channel elements, and each of the channel elements may be assigned to one of up to N carriers of the system.

27. The base station of claim 24 further including a control computer operative to generate one or more control signals for application to the controllable selector so as to control assignment of the received signals from each of the plurality of carriers of the system to each of at least a subset of the channel elements of the given channel unit board.

* * * * *

UNITED STATES PATENT AND TRADEMARK OFFICE
CERTIFICATE OF CORRECTION

| | | |
|---|---|---|
| PATENT NO. | : 7,161,912 B1 | |
| APPLICATION NO. | : 09/420275 | |
| DATED | : January 9, 2007 | |
| INVENTOR(S) | : Dajer et al. | |

It is certified that error appears in the above-identified patent and that said Letters Patent is hereby corrected as shown below:

Delete Title page illustrating a figure, and substitute therefor, new Title page illustrating a figure. (attached)

Delete drawing sheets 1-6B, and substitute therefor drawing sheets 1-6B. (attached()

Signed and Sealed this

Eighth Day of May, 2007

JON W. DUDAS
*Director of the United States Patent and Trademark Office*

(12) United States Patent
Dajer et al.

(10) Patent No.: US 7,161,912 B1
(45) Date of Patent: Jan. 9, 2007

(54) MULTI-CARRIER/MULTI-SECTOR CHANNEL POOLING IN A WIRELESS COMMUNICATION SYSTEM BASE STATION

(75) Inventors: Miguel Dajer, Succasunna, NJ (US); Michael Francis Garyantes, Warren, NJ (US); Harvey Rubin, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/420,275

(22) Filed: Oct. 18, 1999

(51) Int. Cl.
*H04Q 7/20* (2006.01)

(52) U.S. Cl. .......... 370/328; 370/342; 370/346; 455/561; 455/550.1

(58) Field of Classification Search .......... 370/328, 370/329, 335, 342, 343, 441; 455/561, 562, 455/59, 60; 375/130
See application file for complete search history.

(56) References Cited

U.S. PATENT DOCUMENTS

| | | | |
|---|---|---|---|
| 5,021,801 A | 6/1991 | Smith et al. | 455/562 |
| 5,642,353 A * | 6/1997 | Roy, III et al. | 370/329 |
| 5,768,268 A | 6/1998 | Kline et al. | 370/330 |
| 5,867,763 A * | 2/1999 | Dean et al. | 455/5.1 |
| 5,893,033 A | 4/1999 | Keskitalo et al. | 455/437 |
| 6,006,111 A | 12/1999 | Rowland | 455/561 |
| 6,195,566 B1 | 2/2001 | Kanai | 455/562 |

| | | | |
|---|---|---|---|
| 6,400,966 B1 * | 6/2002 | Andersson et al. | 455/561 |

FOREIGN PATENT DOCUMENTS

| | | |
|---|---|---|
| EP | 0 994 582 A1 | 4/2000 |
| JP | 10-023497 | 1/1998 |
| WO | WO 95/33350 | 12/1995 |
| WO | WO 99/18744 | 4/1999 |

OTHER PUBLICATIONS

Merriam-Webster's Collegiate Dictionary, 10th. ed., © 1997, p. 1174.*

* cited by examiner

*Primary Examiner*—Jean Gelin

(57) ABSTRACT

A wireless communication system base station includes a number of channel unit boards, each including multiple channel elements for providing processing operations for signals assigned to multiple carriers of the system. A given channel unit board includes a multiplexer which is operative to implement multi-carrier/multi-sector channel pooling by assigning a given one of the channel elements of that board to any one of the multiple carriers of the system. For example, the multiplexer in the given channel board may be operative to connect the channel elements of that board to I/Q signal buses associated with different system carriers. The I/Q signal bus for each of the carriers is then combined on the given board with corresponding signals from other boards. The invention allows each of N channel elements of the given channel unit board to be assigned to a particular one of up to N carriers of the system, thereby providing substantially improved flexibility in terms of system configuration.

27 Claims, 5 Drawing Sheets